United States Patent [19]

Butzow et al.

[11] 3,713,932
[45] Jan. 30, 1973

[54] METHOD OF MAKING LOW FRICTION FABRIC LINED NUTS OF MULTIPLE LENGTH CONSTRUCTION

[75] Inventors: Neil W. Butzow, Greendale; Bernard Harris, Milwaukee, both of Wis.

[73] Assignee: Rex Chainbelt Inc., Milwaukee, Wis.

[22] Filed: Dec. 15, 1970

[21] Appl. No.: 98,469

[52] U.S. Cl. ............... 156/173, 156/192, 156/193, 161/47, 156/161
[51] Int. Cl. ..................... B32b 5/12, B65h 81/08
[58] Field of Search ...... 156/189, 179, 192, 212, 213, 156/218, 586, 86, 161; 161/47; 285/210

[56] References Cited

UNITED STATES PATENTS 2,751,237  6/1956  Conley ............................. 285/210

FOREIGN PATENTS OR APPLICATIONS 1,340,914  9/1943  France ......................... 156/19

Primary Examiner—J. Steinberg
Attorney—Ernst W. Schultz and Joseph J. Jochman, Jr.

[57] ABSTRACT

A low friction fabric sleeve is wrapped with cords on a long threaded mandrel. The assembly is heated to preset the fabric. A tubular body of resin and glass filament reinforcing is formed over the sleeve and when completed and unscrewed from the mandrel, is cut to the lengths of the desired nuts or internally threaded parts. The tips of the screw threads may include the cords which were wound under tension to form the sleeve on the mandrel.

4 Claims, 9 Drawing Figures

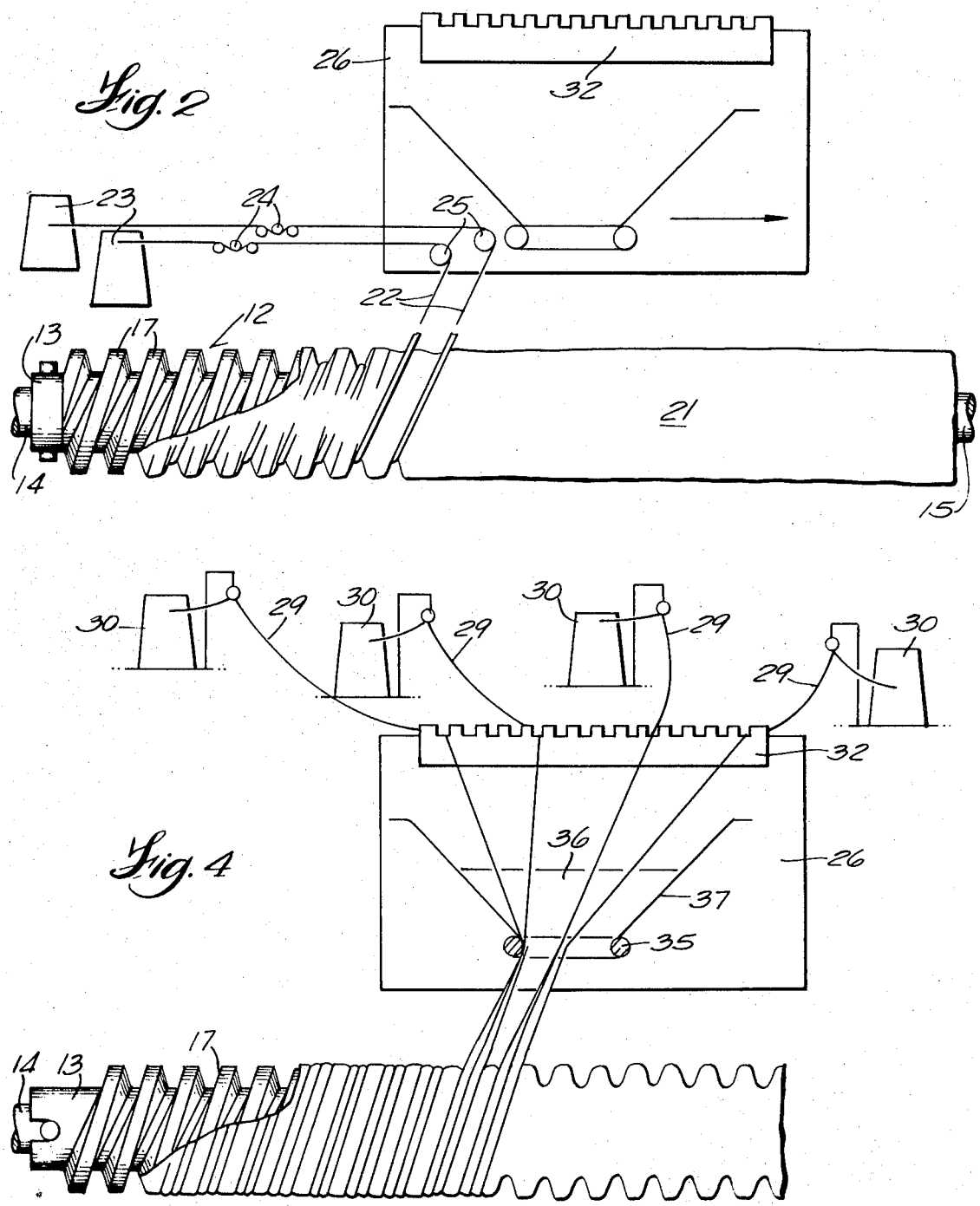

METHOD OF MAKING LOW FRICTION FABRIC LINED NUTS OF MULTIPLE LENGTH CONSTRUCTION

CROSS REFERENCES TO RELATED APPLICATIONS:

Application Ser. No. 730,399 directed to and titled Seamless Fabric-lined Bearing of Multiple Length Construction was filed May 20, 1968, now U.S. Pat. No. 3,616,000 granted Oct. 26, 1971 and application Ser. No. 826,565 directed to and titled Method and Apparatus for Making Ball and Socket Type Bearings in Multiple was filed May 21, 1969 by the present inventors and show in part the general procedures which are included in carrying out the present invention.

BACKGROUND OF THE INVENTION

1. Field of the Invention

Internally threaded low-friction members have many uses as in linear actuators, steering systems, and adjustable linkages. Recirculating ball systems are the most common, but are expensive and relatively large. Lining the nut instead with a low-friction material in the form of a sheet or fabric has been proposed and has had some use.

2. Description of the Prior Art

The prior art includes placing a Teflon fabric sleeve on a threaded mandrel and by injection molding, forming an outer resin body which with the fabric comprises the nut. Larger nuts for specific purposes are made individually by directly bonding the fabric to the internal threads of the nut.

BRIEF SUMMARY OF THE INVENTION

The advantage of the invention resides essentially in the fact that low-friction material lined nuts of adequate load capacity may be produced at low cost. That is, they may be produced consistently and in multiple at relatively high rates. In particular, the invention overcomes difficulties in assuring the fit of the fabric on the mandrel and providing adequate reinforcement of the teeth of the internal screw thread.

BRIEF DESCRIPTION OF THE SEVERAL VIEWS OF THE DRAWING:

FIG. 2 shows in elevation the double-threaded mandrel over on which the fabric sleeve is drawn and shows diagrammatically the winding of two cords over the fabric to conform the fabric to the two threads of the mandrel.

FIG. 4 shows part of the double-threaded mandrel over which the fabric is drawn and the initial laying of the glass fiber strands which are under tension and push the fabric between the mandrel threads.

DESCRIPTION OF THE PREFERRED EMBODIMENT

Figure 3:
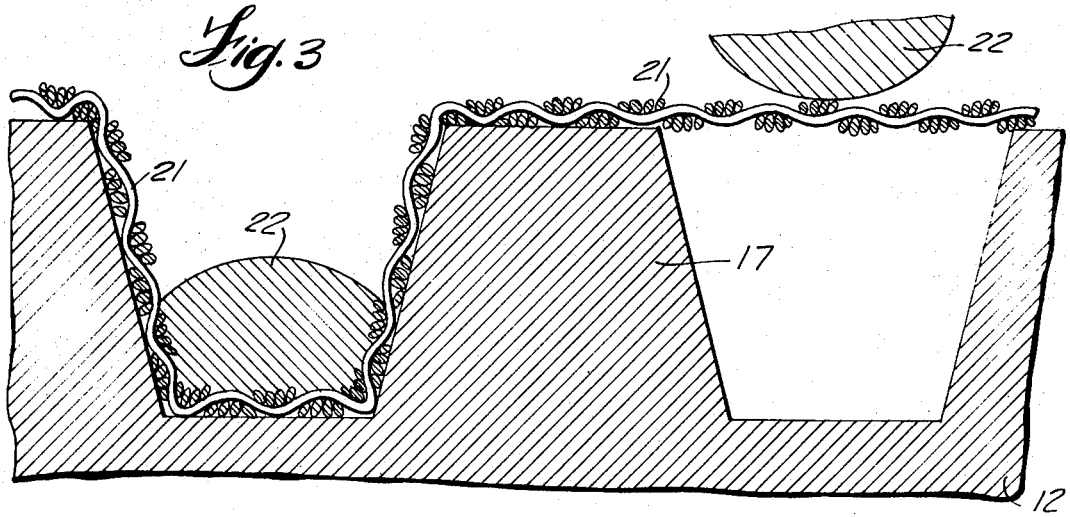
FIG. 3 is an enlarged section of a part of the threaded mandrel with the fabric drawn thereover and pushed by one of the two cords into the space between the adjacent threads of the mandrel.
Figure 9:
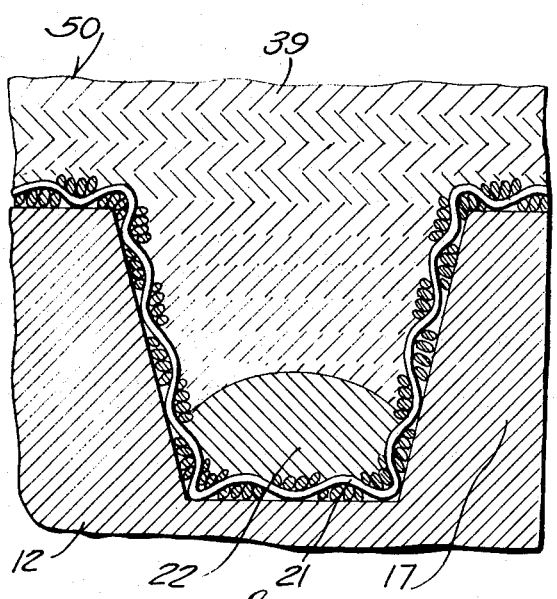
FIG. 9 is a view similar to FIG. 8 but of a larger scale and of a smaller screw thread wherein the cord used for preforming the sleeve forms a part of the tip of the screw thread of the finished nut.
Figure 8:
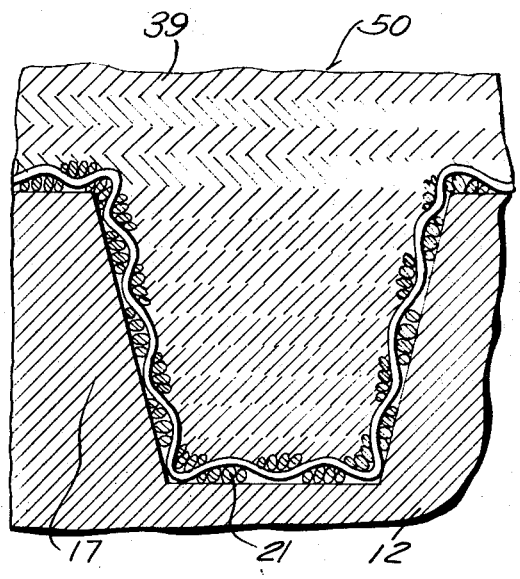
FIG. 8 is an enlarged section of a part of the threaded mandrel with the fabric fitted thereto and overlaid with an outer body of glass fiber reinforced resin.

The mandrel 12 is formed of a stainless steel rod and may be in the order of three to five feet in length depending upon its diameter and the size of the winding machine. The two ends 13 are machined to fit the driving head 14 and the supporting arbor 15 of the winding machine. The screw threads 17 of mandrel 12 are machined to extend substantially the full length thereof and are dimensioned larger than the screws on which the nuts are to fit to provide the desired clearances and screw fit.

The low-friction material facing the mandrel and to form the lining of the nut may be variously provided. In the presently preferred embodiment of the invention, seamless fabric sleeve 21 is woven of low-friction tetraflouroethylene filaments extending lengthwise and circumferential filaments of a heat resistant material which initially upon heating has some shrinkage. Dacron is currently a suitable material of that type. Additionally, the fabric carries a small amount of a thermoplastic material which upon heating to about 200°F. softens and cures to a semi-rigid bonding material which thereafter tends to hold the fabric in the shape it had when the curing occurred.

Another suitable fabric may be of a square weave wherein the yarns in both directions comprise a mixture of Teflon and Dacron yarns.

Sleeve 21 should have a diameter allowing it to slip freely over mandrel 12 with no unnecessary looseness and must be cut to a length which will allow for the gathering required in conforming the sleeve to the screw threads of the mandrel.

Sleeve 21 is drawn on mandrel 12 so that cords 22 may be attached to one end of the mandrel in a suitable manner, not shown. The material of each cord should be heat resistant and also maintain a tension in the order of eight pounds including while heated to a temperature of 300°F.

Where the mandrel 12 has a double thread, two cords 22 are required as shown. The cords are drawn from the creels 23 and pass the tensioning pegs 24 and extend over the pegs 25 of the reciprocating winding head or carriage 26 of the winding machine. For winding cords 22 over sleeve 21, mandrel 12 is slowly rotated as the head 26 moves according to the rotational speed and pitch of the threads. At the start, the cords may require manual guidance into the spaces between the screw threads and should then operate to push the underlying portions of the sleeve into these spaces between the screw threads of the mandrel.

This step of the operation requires some care to be sure that the free portion of the sleeve is progressively and sufficiently gathered to allow the cords and the underlying portions of the sleeve to reach the bottoms of the grooves of the mandrel. For that reason, the size of the cords 22 for each thread must be such that the sleeve is adequately spread across the flats between the threads 17 so that it substantially extends to the corners at the roots of the threads and particularly so that the sleeve fits entirely flat against the faces of the screw threads. Too much gathering might also be possible and could result in a doubling of the sleeve at some points. More generally, the sleeve might be allowed to arch outwardly over the crests of the threads. A small amount of such arching would be allowable and is taken up in the heat shrinkage step. Fortunately here, after some trials, the correct amount of gathering can be readily determined by simply measuring the reduction in the length of the sleeve which has been effected after the cords 22 have been wound fully across the sleeve.

Upon completion of the winding step, the ends of cords 22 should be suitably secured to mandrel 12 which, with the assembly, is then placed in an oven, not shown, to heat the same, typically, at 300°F. for 15 to 30 minutes. This heating and the subsequent cooling serves two purposes: the fabric is shrunk to conform as closely as possible with the outer dimensions of the mandrel and the fabric is preset as in pressing, so that it tends to retain its shape. The presetting of fabric sleeve 21 allows cords 22 to be removed and assures that the grooves of the sleeve will remain in place respecting the mandrel threads.

Generally, cords 22 should be removed from the larger sizes of sleeves. However, their removal without disturbing the placement and fitting of sleeves in the order of one inch in diameter might be difficult because the screw threads are small. If the cord is of a suitable material, such as a monofilament Dacron, the cord can be left in place and allowed to become an integral part of the screw threads, as will be further described. The cords should not, however, be so large that they extend to the pitch line of the threads. It is most important to note that in any case, the sleeve 21 must be and is firmly and securely and entirely pressed against the mandrel before the application of any resin so that there will be no resin overlying the low-friction face of the sleeve when the nut is completed.

As the next step, the mandrel assembly is replaced in the winding machine and a number of roves 29 of glass filaments from creels 30 are combined for winding under tension in the preset grooves of sleeve 21 and over cords 22. The roves pass through the comb 32 carried by winding head 26 and are resin impregnated prior to winding. Their bulk or cross-section should be sufficient to assure that the sleeve is pressed fully across the spaces between the mandrel threads as illustrated in FIG. 3.

In starting the winding the roves are drawn from the creels 30 over the comb 32 in the usual manner. Roves 29 may be dipped in a pan of resin before passing through the ring 35 disposed above the mandrel. Alternatively, as shown, roves 29 pass downwardly through the resin 36 carried in the cone 37 and through the ring 35 which comprises the lower end of the cone. Means such as a loose plug, not shown, is provided to close the lower end of the cone sufficiently to retain the resin supply. Comb 24 and cone 37 are carried by the carriage 28 which may also be provided with means, not shown, to keep the cone supplied with resing.

As shown in the drawings, where the roves 29 are wound over cords 22, they should completely fill the spaces and in particular they should carry an adequate supply of resin to the sleeve. This resin must be allowed to soak into the fabric of the sleeve and completely fill the fabric lying under cords 22 and notwithstanding that the fabric is compressed beneath such cords.

In the manufacture of nuts of small thread sizes, this winding step will be sufficient to fill the preset grooves of the fabric sleeve. For larger threads from which cords 22 have been removed, the winding of roves 29 as described should be repeated. It is presently thought that a third winding overlying two others should generally be avoided. These windings should somewhat "overfill" the preset grooves of the sleeve so that slight ridges are formed. A tension in the order of 6 to 8 pounds per rove is also important to push the resin through the fabric-portions forming the preset grooves.

Figure 5:
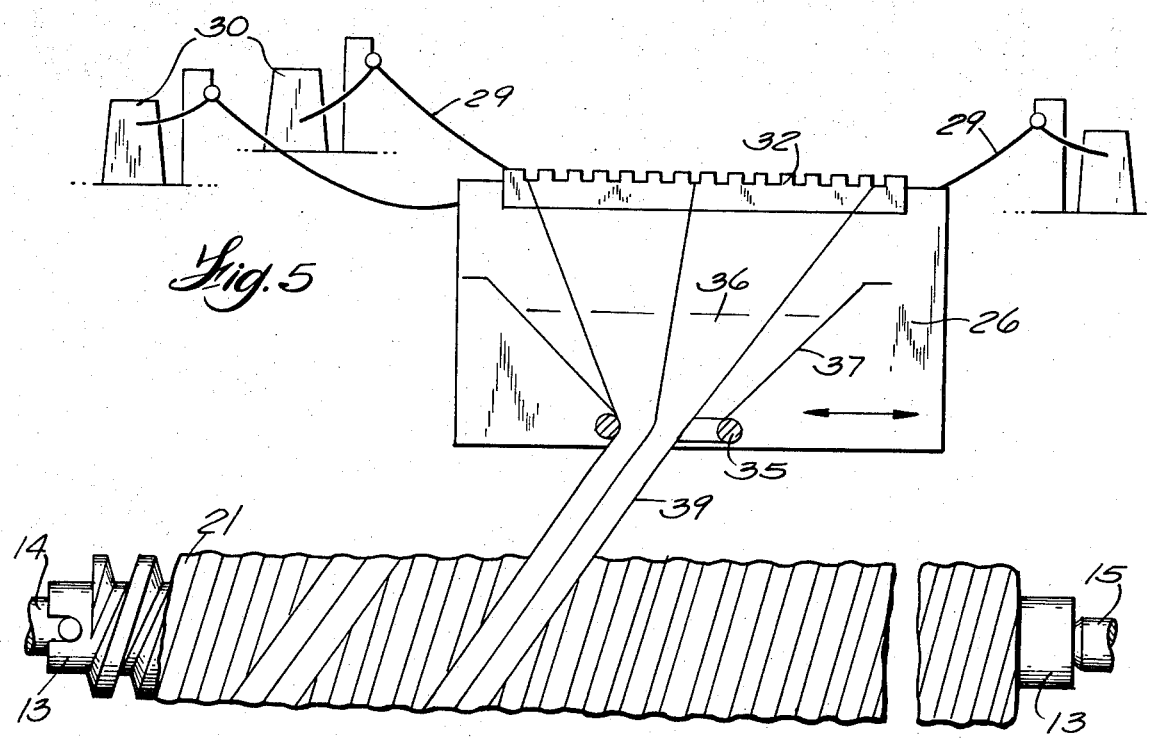
FIG. 5 shows the threaded mandrel in elevation with the fabric and glass filaments applied thereto and the start of the winding step in applying thereover the outer layers glass filament reinforcement.

The filament-tape winding thereover which then follows is similar to that described in the related applications referred to. The tape 39 consists of a number of parallel roves 29 of glass filaments and the resin carried thereby. As shown only in part in FIG. 5, 14 parallel roves 29 may be passed over comb 32 to compose the tape. The end of the tape is first suitably secured to the end of mandrel 12 and as the mandrel rotates, the carriage 28 moves laterally so that the sleeve is wrapped with tape having an axial spacing of twice its width. An adequate tension in the order of 2 to 4 pounds per rove is also required to keep the tape tight and also to be sure of compressing the previously wound filaments. Additionally, it is important again that the resin is driven into and through the fabric.

Figure 6:
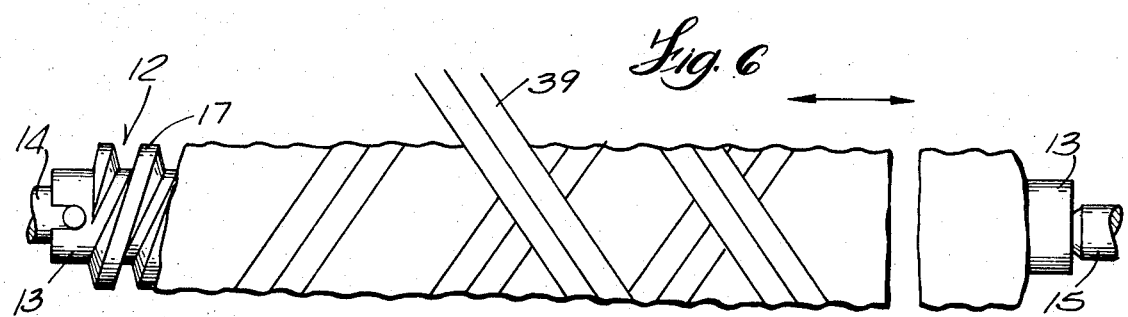
FIG. 6 is a view of part of FIG. 5 showing the partially completed winding of the glass filaments outer layers.
Figure 7:
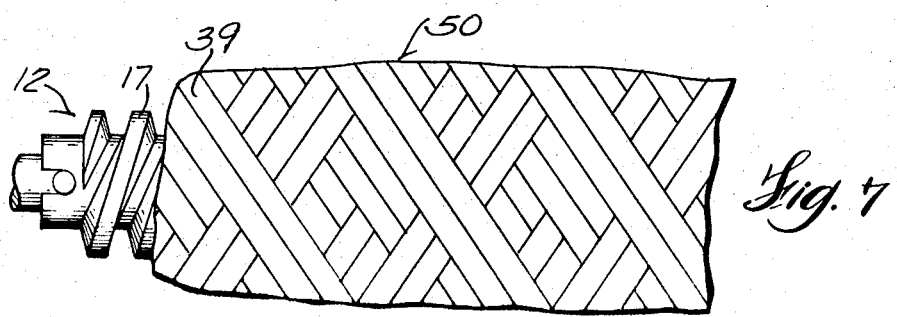
FIG. 7 is an elevation of one end of the completed winding.

When the first reciprocation of carriage 28 is completed as shown in FIG. 6, the winding is continued to provide similar second and third wraps which are respectively offset to form the pattern of FIG. 7. This wrapping is continued until the desired outer diameter of the assembly is reached and the end of the tape is then suitably secured to one end of the mandrel to keep it from unwinding therefrom. The mandrel 12 is handled at its ends and is removed from the winding machine and placed in an oven, not shown, having means for supporting the mandrel horizontally at its end and for rotating the same in the order of 30 r.p.m. during the curing cycle.

Alternatively, resin 36 may be directly heated by infra red or high frequency radio radiation or the mandrel may be heated directly by magnetic induction or electrical resistance means.

Upon hardening of the resin 36, the rigid tube 50 is formed and when cooled may be removed from the mandrel. THe cooling facilitates handling and the contraction of the mandrel 12 relative to tube 50 allows the mandrel to be rotationally withdrawn from the tube.

The tube 50 may be stored and any time as required, the individual nuts 53 of the desired lengths may be cut therefrom. The exterior of each nut is finished first by grinding. Centerless grinding is entirely satisfactory for smaller sizes. Larger sizes would be chucked and especially large sizes in the order of 12 inches in diameter and length might be ground in a lathe. The edges of the bearing may be smoothed with sanding.

A finished nut 53 shown in the enlarged section comprises the exposed portions of the low friction yarns at the bearing surface, the remainder of the fabric being securely embedded and locked in the resin, and the surrpunding layers of glass filaments of roves 29 in the threads and the other filaments extending in opposite spirals from end to end of the nut.

Figure 1:
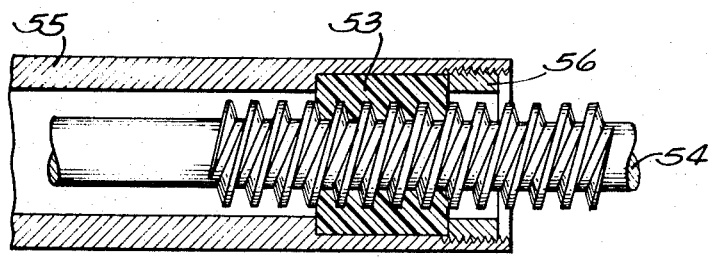
FIG. 1 is a section of part of a screw-type linear actuator to show a typical application of the nut manufactured by the method of the present invention. The remaining figures show the method of making the nut.

A finished nut 53 is shown in FIG. 1 as applied to the long threaded screw 54 which with the outer tube 55 forms the extensible parts of a linear actuator. The nut 53 is suitably secured in the counter-bored end of tube 55 by the threaded ring 56 and against rotation such as by a pin, not shown, or in any suitable manner. Such threaded devices may operate without lubrication and for that reason have uses for which other types of linear actuators, e.g., hydraulic cylinders and recirculating ball type nuts are not suitable.

According to the present invention, nuts of the same thread size and style can be cut to any desired length. The use of the cords 22 and presetting of the fabric facilitates carrying out the initial winding step to provide nuts of a consistently high degree of quality and size accuracy, and low gear rate. Where somewhat lesser requirements may be satisfied, the sleeve 21 might be gathered on and fitted on mandrel 12 by winding with the glass-filament roves 29 which remain a part of the finished bearing. However, the use of a resin therewith having a relatively short curing cycle and many resins of a tacky nature, present manipulating difficulties. That is, it becomes very difficult to complete the gathering and fitting of the loose sleeve without wrinkles and overlays.

The invention provides for the very economical manufacture of such nuts in multiple lengths which has heretofore never been possible and low-friction self lubricated nuts which are of extreme accuracy for fitting screw threads with no looseness.

We claim:

1. A method of making a low-friction material lined internally-threaded glass-filament reinforced thermoresin plastic body in the form of a nut which comprises: the steps of providing a rigid threaded rod for a mandrel, providing a lining in the form of a heat-settable circumferentially shrinkable fabric sleeve having on inner low-friction surface, drawing said sleeve over the mandrel and progressively conforming the sleeve to the mandrel with corresponding portions thereof extending to the roots of the mandrel screw threads, then heating the assembly to preset the sleeve in conformance with the threads by allowing the assembly to cool so that the sleeve shrinks and sets closely fitting the mandrel threads, progressively winding under tension over the sleeve one or more groups of resin-carrying glass filaments to fully fill the space between the thread and press the sleeve to the mandrel screw threads and, securing the ends of said filaments to the ends of the mandrel, winding over the assembly in overlying layers glass filaments carrying liquid resin to the assembly to form an outer body, curing the resin to form a rigid tube fitting the mandrel with the low friction sleeve facing and conforming thereto, removing the mandrel from the tube by relatively rotating the same, and cutting the tube into individual lengths of the desire size to produce individual nuts.

2. A method as in claim 1 wherein the step of conforming the sleeve to the mandrel is accomplished by wrapping heat resistant cords over the sleeve and into the roots of the mandrel screw threads.

3. A method as in claim 2 wherein the wrapping cords are removed prior to further winding of the resin-carrying glass filaments.

4. A method as in claim 2 wherein the wrapping cords remain prior to winding the resin-carrying glass filaments.

* * * * *